May 12, 1931.    G. E. KING    1,805,248
MOTOR CONTROL SYSTEM
Filed Oct. 15, 1926
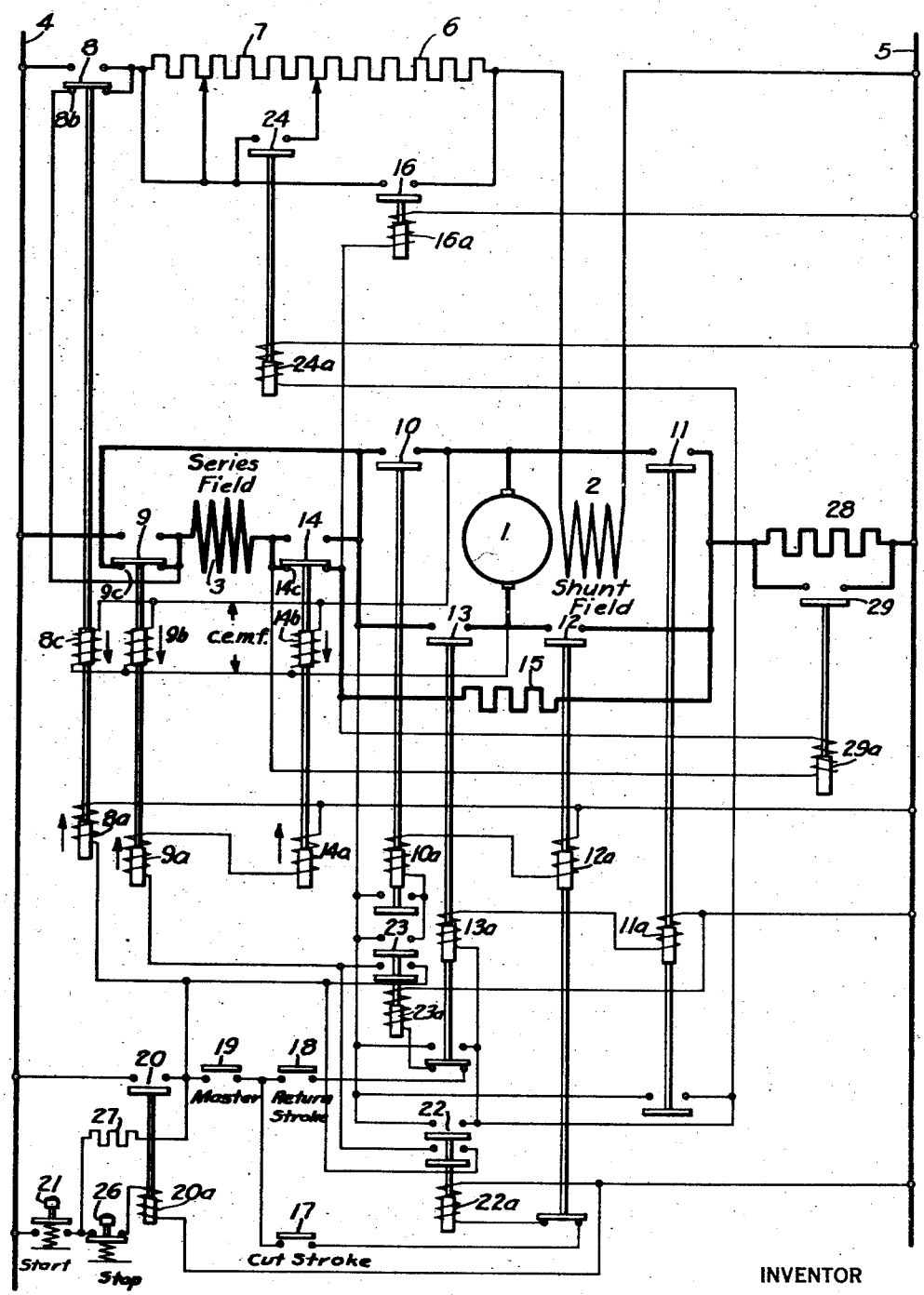
INVENTOR
George E. King
BY
Wesley G. Carr
ATTORNEY Patented May 12, 1931

1,805,248

UNITED STATES PATENT OFFICE

GEORGE E. KING, OF WILKINSBURG, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed October 15, 1926. Serial No. 141,715.

My invention relates to motor-control systems and it has particular relation to the braking of remote reversible motors such as those employed in planer systems and the like.

One object of my invention is to provide an improved means for effecting dynamic braking of the motors automatically upon the failure of the source of power, when the motor is running in either direction.

A second object of my invention is to provide means responsive to the counter-electromotive force of a reversible motor for automatically connecting the shunt field winding in a manner to provide effective dynamic braking when the motor is running in either direction.

Another object of my invention is to provide means responsive to the counter-electromotive force of a reversible motor for connecting the series field winding and a braking resistor in a manner to provide effective dynamic braking for the motor when running in either direction.

A further object of my invention is the provision of a reliable means for stopping a reversible motor quickly and independently of any external power.

Another object of my invention is to provide a system of the above-mentioned character which shall be simple and reliable in operation and relatively inexpensive to manufacture and install.

Further objects of my invention will become evident from the following detailed description taken in connection with the accompanying drawing, in which The single figure is a diagrammatic view of a planer-control system embodying my invention.

Referring to the drawing, the system illustrated comprises a reversible motor having an armature 1, a shunt field winding 2 and a series field winding 3. The shunt field winding is connected between the line conductors 4 and 5 through the cut and return resistors 6 and 7 and an auxiliary contactor 8. A main line contactor or switch 9 is adapted to connect the motor to the positive line conductor 4. Two pairs of reversing switches or contactors 10 and 12, 11 and 13, respectively, are connected to terminals of the armature, in accordance with a familiar practice.

The series field winding 3 may be connected to the brushes of the armature 1 through the main-line contactor 9 and a series-field-circuit contactor 14. The series field winding may also be connected through the back contact members 14c of the series field contactor 14 in series relation with a braking resistor 15 and through the back contact members 9c of the main line contactor 9 to the pairs of reversing switches 10 and 12 or 11 and 13, across the brushes of the armature 1.

Pilot switches 17 and 18 are arranged in the bed of the planer motor and are mechanically operated at the beginning of the "cut" and "return" stroke, respectively, of the planer, in a well known manner. Consequently, no further description or illustration thereof is deemed to be necessary. These switches thus serve to regulate the direction of rotation of the motor and, when closed, are connected to the line conductors 4 and 5 through the contact members of a low-voltage relay 20, a suitable master switch 19, and either the back or lower contact members of the reversing switch 12 and the actuating coil 22a of the auxiliary contactor 22 to the conductor 5 or the back or lower contact members of the reversing switch 13 and the actuating coil 23a of the auxiliary contactor 23 to the conductor 5, depending on which one of the pilot switches 17 or 18 is closed by the operation of the planer platen.

The resistors 6 and 7 are connected in series relation with the shunt field winding 2 for regulating the speed of the motor. The "cut" resistor 6 is governed by a contactor or relay 24 that is actuated ʋ a coil 24a to automatically provide a ..ower cutting than returning speed for the planer motor. A full-field relay 16 is utilized to short circuit the "cut" and "return" resistors 6 and 7 when the motor is starting and stopping, the relay being actuated by a coil 16a connected in shunt relation to the starting and braking resistors 28 and 15.

The shunt field relay 8 is connected between the positive line conductor 4 and the cut and return resistors 6 and 7 in the shunt field circuit. The back contact members 8b of the shunt-field relay are connected between the "cut" and "return" resistors 6 and 7 and the motor side of the main line contactor 9.

The switch elements or contact members of the low-voltage relay 20 are connected across the lines 4 and 5 by a circuit extending from line 4 through the contact members of relay 20, through contact members of one or the other of the auxiliary relays 22 or 23, depending on which one of these is energized, actuating coils 9a and 14a of the line contactor 9 and the series field contactor 14, respectively, to the line conductor 5. The starting switch 21 is connected, in parallel-circuit relation, to contact members of the low-voltage relay 20. The stop switch 26 is connected between line conductors 4 and 5 by a circuit extending either from conductor 4, through "start" switch 21, "stop" switch 26, actuating coil 20a of low-voltage relay 20, to the line conductor 5, or from line conductor 4, through the contact members of low-voltage relay 20, resistor 27, the stop switch 26, actuating coil 20a of low voltage relay 20, to the line conductor 5.

The master switch 19 is connected between the line conductors 4 and 5 through the "cut" pilot switch 17, back contact members on the reversing switch 12 and through the actuating coil 22a of the auxiliary relay 22, or through the "return" pilot switch 18, back contact members of the reversing switch 13 and through the actuating coil 23a of the auxiliary relay 23.

The actuating coils of the reversing switches 10 and 12 and 11 and 13 are connected between the motor side of the series-field-circuit contactor 14 and the negative line conductor 5 through interlocks on the auxiliary relays 22 and 23, respectively.

Holding circuits are provided for the reversing switches 10 and 12 and 11 and 13, and are controlled by interlocks on the said switches that are connected in series relation with their actuating coils 10a and 12a and 11a and 13a, respectively, to short circuit the contact members of the auxiliary relays 22 and 23 when the reversing switches 10 and 12 and 11 and 13, respectively, are closed.

The operation of the system shown in the drawing may be described as follows: Assuming that the pilot switch 17 is closed for effecting a cutting stroke and that the starting switch 21 and the master switch 19 have been closed, a circuit is established from the positive line conductor 4 through the starting and stopping switches 21 and 26, the actuating coil 20a of the low-voltage relay 20 to the negative line conductor 5. Upon the closure of the low-voltage relay 20, the actuating coil 8a of the shunt-field relay 8 will be energized, causing the relay 8 to be actuated to close a circuit through the upper contacts of the relay and through the shunt field winding 2. The closure of the low-voltage relay 20 also completes a circuit from the positive line conductor 4 through the master switch 19, the pilot switch 17, the back contact members of the reversing switch 12 and the actuating coil 22a of the auxiliary relay 22 to the negative line conductor 5, causing the relay 22 to operate to close its contacts.

Upon the operation of the auxiliary relay 22 and the consequent closing of the contact members of this relay, a circuit is established from the positive line conductor 4, through the low-voltage relay 20, the lower contact member of the auxiliary relay 22, the actuating coil 9a of the main line contactor 9 and the actuating coil 14a of the series-field-circuit contactor 14, to the negative line conductor 5. Closing of the contact members of the low-voltage relay 20 also established a holding circuit for the actuating coil 20a, through contact members of relay 20, resistor 27, "stop" push-button switch 26, and the actuating coil 20a, to the negative line conductor 5. The circuit connections above discussed and others hereinafter more particularly specified are thus established in the proper sequence, regardless of the position of the "start" push-button switch 21.

The closure of the auxiliary relay 22, the main-line contactor 9 and the series-field-circuit contactor 14 causes a circuit to be established from positive line conductor 4, through the main-line switch 9, the series field winding 3, series-field-circuit contactor 14, the upper contact member of auxiliary relay 22, the actuating coils 13a and 11a of the reversing switches 13 and 11, respectively, to the negative line conductor 5. The closure of the reversing contactors 13 and 11 connects the armature winding 1 across the line conductors 4 and 5 for operation in the cutting direction. The circuit for the motor may be traced from the negative line conductor 4, through the upper contact members of main-line contactor 9, series field 3, upper contact members of series-field-circuit contactor 14, the uppermost contact members of reversing switch 13, the motor armature 1, the uppermost contact member of reversing switch 11, and starting resistor 28, to the negative line conductor 5.

Actuation of the auxiliary relay 22, in addition to establishing circuits for the reversing switches 13 and 11, establishes a circuit from the positive line conductor 4, through the upper contact members of contactors 9 and 14, the upper contact member of auxiliary relay 22, the actuating coil 24a of the cutting-speed regulating relay 24, to the negative line conductor 5. The speed of the motor in the cut direction will thus be slow, as desired, since a material portion of the resistor sections 6 and 7 is shunted by the operation of the cutting-speed regulating relay 24.

When the motor armature is first supplied with energy, as above explained, the starting resistor 28 is connected in series-circuit relation to the armature; however, this starting resistor is provided with a shunting switch 29. This shunting switch is controlled by an actuating coil 29a so connected with reference to the motor armature as to be responsive to a predetermined counter-electromotive-force of the motor. Since the counter-electromotive-force is a direct function of speed, the elements 29 and 29a function as an accelerating relay to shunt the starting resistor 28.

A "full-field" relay 16 is arranged to close a circuit in shunt relation to the resistors 6 and 7 when the motor is stopping or reversing, thereby permitting a larger current to flow through the shunt field winding 2. This relay is actuated by a coil 16a which is connected in parallel circuit relation to the braking resistor 15 and the starting resistor 28. This causes the full-field relay 16 to close when current is flowing through either the starting resistor 28, while starting, or the braking resistor 15, when the motor is stopping.

Upon closure of the interlock on the reversing switch 13, the actuating coils 13a and 11a are connected across the armature 1 through the reversing switches 13 and 11, providing a holding circuit for maintaining said switches closed by means of the counter-electromotive force during dynamic braking at the end of the cutting stroke, as traced below.

At the end of the cutting stroke, the "cut" pilot switch 17 is actuated to the open position and the "return" pilot switch 18 is actuated to the closed position in the usual manner. During the transition period between the opening of the "cutting" pilot switch 17 and the closing of the "return" pilot switch 18, the actuating coil 22a of the auxiliary relay 22 will be deenergized, causing said contactor to open, thereby interrupting the energizing circuit to the actuating coils 9a and 14a of the main line contactor 9 and the series-field-circuit contactor 14, causing the latter two contactors to also open. The back contact members 9c and 14c of the main line contactor 9 and the series-field-circuit contactor 14 are thus closed by means of their corresponding actuating coils 9b and 14b that are connected across the terminals of the armature 1, thereby setting up a dynamic-braking circuit through the braking resistor 15 and the series field winding 3.

The dynamic-braking circuit comprises the armature 1, the uppermost contact members of reversing switch 13, the back or lower contact members 9c of main line contactor 9, the series field 3, the back contact members 14c of the series-field contactor 14, the dynamic-braking resistor 15, the upper contact members of the reversing switch 11 to the armature 1 of the motor.

It will be noted that the reversing switches 13 and 11 are held closed by reason of the counter-electromotive-force of the motor being applied to their actuating coils through the previously traced circuit. When the counter-electromotive-force of the motor drops substantially to zero, the reversing switches 13 and 11 open. In the meantime, the transition has taken place and the return pilot switch 18 is closed, whereupon actuating coil 23a is energized and the auxiliary relay 23 closes its contact members. Operation of the relay 23 causes operation of the main line contactor 9 and the series-field contactor 14, whereupon a circuit is established for the respective actuating coils 10a and 12a of the reversing switches 10 and 12. This circuit may be traced through the contact members of contactors 9 and 14 and the upper contact members of auxiliary relay 23, actuating coils 10a and 12a, respectively, to the negative line conductor 5.

The connections of the series field winding 3 are, however, reversed with respect to the armature 1, so that when the direction of current flow through the armature reverses, the direction of current flow through the field winding 3 remains in the same direction. It will be noted that, during the "return" stroke, neither the relay 16 nor the relay 24 is energized. Substantially all sections of the resistors 6 and 7 are thus in circuit with the shunt field winding insuring a weak excitation and, in consequence, a rapid return speed.

At the end of the "return" stroke, the "return" pilot switch 18 is opened, and the "cutting" pilot switch 17 is actuated to the closed position. During this transition period, the contactors 9 and 14 open their upper contact members and close their lower contact members; the contact members of the relay 16 are closed, but the reversing switches 11 and 13, due to the counter-electromotive-force of the motor, remain closed. The dynamic-braking circuit is thereby established through the braking resistor 15 and the series-field winding 3, as previously traced. The current flow is, however, in the opposite direction.

Upon the failure of the source of energy, or when the stopping push-button 26 is pressed, the low-voltage relay 20 is deenergized, which deenergizes the actuating coils of the main-line contactor 9, the series-field-circuit contactor 14 and the actuating coil of the shunt-field relay 8, causing these contactors to open. On the opening of the shunt field relay 8, it closes a circuit through its back contact members 8b connecting the shunt field winding 3 across the armature of the motor, and is held in this position by the actuating coil 8c which is connected across the armatures to the motor and is therefore energized in accordance with the counter-voltage of the motor. Since the shunt field winding is connected across the armature of the motor, the current in the shunt field winding will vary as the counter-voltage varies to aid in establishing a dynamic-braking circuit similar to the previously traced circuits on interruption of the power to the armature alone, when reversing.

It will be seen that I have provided a relatively simple system whereby electric braking is utilized when a reversible motor is reversing in either direction, and also means for utilizing the shunt field winding to aid such braking upon failure of the source of power.

It will be understood that I do not limit my invention to the specific form shown or the specific switching device illustrated in the drawing. It is apparent that further modifications may be made in the arrangement of circuits and apparatus employed without departing from the spirit of my invention. It will be understood also that I do not limit my invention to the specific apparatus illustrated but desire that only such limitations shall be imposed as are indicated in the appended claims.

I claim as my invention:

1. A system of motor control comprising a reversible motor having an armature winding, a series field winding and a shunt field winding, a braking resistor, a source of power, means for connecting said motor windings to said source, means rendered active upon failure of said power for connecting said shunt field winding across the armature winding, and means for connecting said braking resistor and said series field winding in series relation with the armature winding in a manner to aid the shunt field winding to provide automatic electric braking when the motor is running in either direction.

2. In a motor-control system, in combination, a motor provided with shunt field, series field and armature windings, a variable resistor disposed in series-circuit relation with said shunt field winding, a starting resistor, a source of power supply, means disposed to connect said shunt field winding and variable resistor across said power supply, means controlled by said shunt field power-supply connecting means for connecting and disconnecting said armature and series field windings from said source of power, and means operable in response to the failure of said power supply for said motor to connect said shunt field winding, variable resistor and starting resistor across the motor armature.

3. In a motor-control system, in combination, a motor provided with a shunt field, series field and armature windings, a variable resistor disposed in series relation with said shunt field winding, a starting resistor, a source of power supply, means disposed to connect said shunt field winding and variable resistor across said power supply, means controlled by said shunt field power-supply connecting means for connecting and disconnecting said armature and series field windings from said source of power, means operable in response to the failure of said power supply for said motor to connect said shunt field winding, variable resistor and starting resistor across the motor armature to excite the shunt field by the counter-electromotive force of the motor, a braking resistor, and means disposed to reverse and connect said series field winding and braking resistor in circuit with said motor armature to effect dynamic-braking action by the motor.

4. In a motor-control system, in combination, a motor provided with a shunt field, series field and armature windings, a variable resistor disposed in series relation with said shunt field winding, a starting resistor, a source of power supply, means disposed to connect said shunt field winding and variable resistor across said power supply, means controlled by said shunt field power-supply connecting means for connecting and disconnecting said armature and series field windings from said source of power, means operable in response to the failure of said power supply for said motor to connect said shunt field winding, variable resistor and starting resistor across the motor armature to excite the shunt field by the counter-electromotive force of the motor, a braking resistor, means disposed to reverse and connect said series field winding and braking resistor in circuit with said motor armature to effect dynamic-braking action by the motor, and means responsive to the voltage drop across said braking resistor for shunting said variable resistor.

5. A motor having armature, series and shunt field windings, an accelerating resistor disposed for connection in circuit with said armature, a source of power for said motor, means for connecting said shunt field winding across the source of power, means for connecting and disconnecting said armature and series field windings in series-circuit relation from said source of power, dynamic-braking means for said motor, and means responsive to failure of said source of power disposed to connect said shunt field winding and accelerating resistor in series-circuit relation across the armature winding whereby the effect of the dynamic-braking means is affected by said shunt field windings.

6. In combination, a motor having armature, shunt and series field windings, a shunt field resistor, a braking resistor, a source of power supply, means for connecting said shunt field winding and said field resistor in series-circuit relation across said source of power supply, means for reversing said series field winding, means for reversing said armature winding, means responsive to failure of said source of power supply disposed to actuate said series-field-winding-reversing means and said shunt-field-winding-connecting means to thereby connect said series field winding and braking resistor in series-circuit relation across said armature winding, and to connect said shunt field winding and field resistor across said armature winding whereby said shunt and series field windings cooperate to establish compound field excitation for effecting dynamic braking by said motor, and means responsive to the current in said braking resistor for shunting said shunt-field-winding resistor.

7. In a motor-control system, in combination, a motor provided with series field and armature windings, reversing means for said series field winding, reversing means for said armature winding disposed for operation by said field-winding-reversing means, a source of power supply, means disposed to actuate said series-field-winding-reversing means to a position to effect motor operation, and means controlled by said series-field-winding-reversing means for actuating said armature-reversing means to a position to connect said motor armature winding in series-circuit relation with said series field winding across said source of power supply in response to the actuation of said field-winding-reversing means to its position effecting motor operation, said armature-reversing means being connected across said armature winding to be responsive to the counter-voltage of said armature when the power supply is disconnected from the motor.

8. In a motor-control system, in combination, a motor having armature, series and shunt field windings, a variable resistor disposed in circuit relation with said shunt field winding, a source of power supply, means for connecting said shunt field winding and variable resistor across said source of power supply, means responsive to failure of said power supply for connecting said shunt field winding across said armature winding, means for connecting said armature winding and series field winding across said power supply for effecting motor operation, a braking resistor, and means controlled by said power-supply failure means for connecting said braking resistor across said armature winding to establish dynamic-braking action by said motor.

9. In a motor-control system, in combination, a motor having armature, series and shunt field windings, a variable resistor disposed in circuit relation with said shunt field winding, a source of power supply, means for connecting said shunt field winding and variable resistor across said source of power supply, means responsive to failure of said power supply for connecting said shunt field winding across said armature winding, means for connecting said armature winding and series field winding across said power supply for effecting motor operation, a braking resistor, means controlled by said power-supply failure means for connecting said braking resistor across said armature winding to establish dynamic braking action by said motor, and means responsive to current in said braking resistor for shunting said variable resistor to thereby increase said braking action.

10. In a motor-control system, in combination, a motor having armature, series and shunt field windings, a variable resistor disposed in circuit relation with said shunt field winding, a source of power supply, means for connecting said shunt field winding and variable resistor across said source of power supply, means responsive to failure of said power supply for connecting said shunt field winding across said armature winding, means for connecting said armature winding and series field winding across said power supply for effecting motor operation, a braking resistor, and means controlled by said power-supply-failure means for reversing said series field winding and connecting it in series relation with said braking resistor across said armature winding, whereby dynamic-braking action resulting from said series and shunt field windings is rendered accumulative.

11. In a motor-control system, in combination, a motor having armature, series and shunt field windings, a variable resistor disposed in circuit relation with said shunt field winding, a source of power supply, means for connecting said shunt field winding and variable resistor across said source of power supply, means responsive to failure of said power supply for connecting said shunt field winding across said armature winding, means for connecting said armature winding and series field winding across said power supply for effecting motor operation, a braking resistor, means controlled by said power-supply-failure means for reversing said series field winding and connecting it in series relation with said braking resistor across said armature winding, whereby dynamic-braking action resulting from said series and shunt field windings is rendered accumulative, and means responsive to current in said braking resistor for shunting said variable shunt-field-winding resistor to thereby increase said braking action.

12. In a motor-control system, in combination, a motor provided with armature, series and shunt field windings, a resistor disposed in circuit relation with said field winding, a source of power supply, means for connecting said resistor and shunt field winding across said source of power supply, means for connecting said series field winding in series-circuit relation across said source of power, means for reversing said armature winding, a braking resistor, means for disconnecting said series field and armature windings from said source of power before said armature winding is reversed, and means controlled by said power-disconnecting means for reversing said series field winding and connecting it in series-circuit relation with said braking resistor across said armature winding to establish dynamic-braking action by the motor.

13. In a motor-control system, in combination, a motor provided with armature, series and shunt field windings, a resistor disposed in circuit relation with said field winding, a source of power supply, means for connecting said resistor and shunt field winding across said source of power supply, means for connecting said series field winding in series-circuit relation across said source of power, means for reversing said armature winding, a braking resistor, means for disconnecting said series field and armature windings from said source of power before said armature winding is reversed, means controlled by said power-disconnecting means for reversing said series field winding and connecting it in series-circuit relation with said braking resistor across said armature winding to establish dynamic-braking action by the motor, and means responsive to the counter-voltage of said armature winding for rendering said armature-reversing means ineffective to reverse said armature until the counter-voltage has decreased to a predetermined value.

14. In a motor-control system, in combination, a motor provided with armature, series and shunt field windings, a resistor disposed in circuit relation with said field winding, a source of power supply, means for connecting said resistor and shunt field winding across said source of power supply, means for connecting said series field winding in series-circuit relation across said source of power, means for reversing said armature winding, a braking resistor, means for disconnecting said series field and armature windings from said source of power before said armature winding is reversed, means controlled by said power-disconnecting means for reversing said series field winding and connecting it in series-circuit relation with said braking resistor across said armature winding to establish dynamic-braking action by the motor, and means responsive to current in said braking resistor for shunting said shunt-field winding resistor to further increase said dynamic-braking action.

15. In a motor-control system, in combination, a motor provided with armature, series and shunt field windings, a resistor disposed in circuit relation with said shunt field winding, a source of power supply, means for connecting said resistor and shunt field winding across said source of power supply, means for connecting said series field winding in series-circuit relation across said source of power, means for reversing said armature winding, a braking resistor, means for disconnecting said series field and armature windings from said source of power before said armature winding is reversed, means controlled by said power-disconnecting means for reversing said series field winding and connecting it in series-circuit relation with said braking resistor across said armature winding to establish dynamic-braking action by the motor, and means responsive to failure of said power source for connecting said shunt field winding and shunt-field-winding resistor in series-circuit relation across said motor armature, said means being disposed, upon failure of power supply, to reverse said series field winding and to connect it in series-circuit relation with said braking resistor across said armature winding.

16. In a motor-control system, in combination, a motor provided with armature, series and shunt field windings, a resistor disposed in circuit relation with said field winding, a source of power supply, means for connecting said resistor and shunt field winding across said source of power supply, means for connecting said armature and series field windings in series-circuit relation across said source of power, means for reversing said armature winding, a braking resistor, means for disconnecting said series field and armature windings from said source of power before said armature winding is reversed, means controlled by said power-disconnecting means for reversing said series field winding and connecting it in series-circuit relation with said braking resistor across said armature winding to establish dynamic-braking action by the motor, means responsive to failure of said power source for connecting said shunt field winding and shunt field resistor in series-circuit relation across said motor armature, said means being disposed, upon failure of power supply, to reverse said series field winding and to connect it in series-circuit relation with said braking resistor across said armature winding, and means responsive to current in said braking resistor for shunting said shunt-field winding resistor to further increase said dynamic-braking action.

17. In a motor-control system, in combination, a motor provided with armature, series and shunt field windings, a resistor disposed in circuit relation with said field winding, a source of power supply, means for connecting said resistor and shunt field winding across said source of power supply, means for connecting said armature and series field windings in series-circuit relation across said source of power, means for reversing said armature winding, a braking resistor, means for disconnecting said series field and armature windings from said source of power before said armature winding is reversed, and means controlled by said power-disconnecting means for reversing said series field winding and connecting it in series-circuit relation with said braking resistor across said armature winding to establish dynamic-braking action by the motor.

18. A system of motor control comprising a reversible motor having a shunt field winding and an armature winding, a source of power, means for connecting said armature winding to the source of power, means for connecting the field winding to the source of power, a dynamic braking circuit for the motor, and means rendered active upon failure of the voltage of the source of power and responsive to the counter-electromotive force of said reversible motor for connecting the dynamic braking circuit in series with the motor and for connecting the shunt field winding to the armature winding in a direction to provide strong field excitation while the dynamic braking circuit is connected to the motor.

19. A system of motor control comprising a reversible motor having an armature winding, a shunt field winding and a series field winding, a source of power, means for connecting said motor windings to said source, a dynamic braking circuit for said motor, means for establishing the dynamic braking circuit for the motor upon failure of voltage of the source of supply, means rendered active upon failure of voltage of the source of power for disconnecting the shunt field winding from said source and for so connecting it across the armature winding that the counter-electromotive force of the motor tends to increase the field strength during dynamic braking irrespective of the direction of rotation of the motor, and means for so connecting the series field winding in said circuit that it aids the shunt field winding irrespective of the direction of rotation of said motor.

In testimony whereof, I have hereunto subscribed my name this 2nd day of October, 1926.

GEORGE E. KING.